US009065566B1

(12) United States Patent
Richards et al.

(10) Patent No.: US 9,065,566 B1
(45) Date of Patent: Jun. 23, 2015

(54) DIGITIZATION AND TRANSPORT OF RETURN PATHS EMPLOYING DIFFERENT FREQUENCY SPECTRUMS

(71) Applicant: ARRIS Solutions, Inc., Suwanee, GA (US)

(72) Inventors: Laurence Richards, Port Matilda, PA (US); Zhijian Sun, Avon, CT (US); Zoran Maricevic, West Hartford, CT (US); Dean Painchaud, Cromwell, CT (US)

(73) Assignee: ARRIS Solutions, Inc., Suwanee, GA (US)

( * ) Notice: Subject to any disclaimer, the term of this patent is extended or adjusted under 35 U.S.C. 154(b) by 9 days.

(21) Appl. No.: 13/804,745

(22) Filed: Mar. 14, 2013

(51) Int. Cl.
*H04B 10/2575* (2013.01)

(52) U.S. Cl.
CPC .................. *H04B 10/2575* (2013.01)

(58) Field of Classification Search
CPC ........... H04B 10/2503; H04B 10/2575; H04B 10/2581; H04B 10/271; H04B 10/275; H04B 10/5059; H04B 14/0213; H04B 14/0216; H04B 14/0283; G02B 6/14; G02B 6/262

USPC ........... 375/219–220, 257, 259, 295; 398/43, 398/44, 58, 59, 67, 70, 72, 128, 130, 135, 398/137–143, 162; 455/69
See application file for complete search history.

(56) References Cited

U.S. PATENT DOCUMENTS

| 2003/0156602 A1* | 8/2003 | Sage | 370/480 |
| 2008/0019706 A1* | 1/2008 | Levinson et al. | 398/202 |
| 2011/0255878 A1* | 10/2011 | Sage | 398/202 |

* cited by examiner

*Primary Examiner* — Young T Tse
(74) *Attorney, Agent, or Firm* — Bart A. Perkins (57) ABSTRACT

Systems and methods of this disclosure can operate to provide digitization and optical transport of legacy and extended return path signals in hybrid fiber-coax (HFC) based broadband networks. A common radio frequency (RF) front-end can be used for the digitization of return path signals comprising analog to digital converters (A/Ds) with a precision and sampling rate to meet the SNR requirements of the communication system. Additionally the same digital signal processing logic can also be used through the implementation of digital filter(s) in FPGA technology where different FPGA images can be used to support different digital filtering configurations.

19 Claims, 7 Drawing Sheets

DIGITIZATION AND TRANSPORT OF RETURN PATHS EMPLOYING DIFFERENT FREQUENCY SPECTRUMS

TECHNICAL FIELD

This disclosure relates to digitizing and transporting return paths utilizing different frequency spectrums.

BACKGROUND

Multiple Service Operators (MSOs) can offer a variety of services, including analog television (TV), digital TV, video on demand (VoD), telephony and high speed internet. MSOs can offer these services over a bi-directional hybrid fiber-coaxial (HFC) network utilizing optical fiber and coaxial cable. Bi-directional communications can be achieved through a forward path (e.g., downstream) and a return path (e.g., upstream). The forward path can be used to carry video, voice and data information from a MSO's master headend to subscriber homes. The return path can be used to carry control signals (e.g., VoD requests), voice and data information from subscribers' homes to the master headend of the MSO.

Optical fiber can be used to communicate information between a master headend and a fiber node. The fiber node can convert optical information to radio frequency (RF) modulated electrical signals to transfer information to subscriber homes through a coax based network. The forward path RF signals can represent multiple channels residing over a frequency spectrum (e.g., 50 MHz to 1000 MHz range). The fiber node can also convert return path RF signals residing on a frequency spectrum different from the forward path signals (e.g., 5 MHz to 42 MHz) for optical transmission to the master headend.

The Data-Over-Cable Interface Specification (DOCSIS) was established by MSOs to facilitate transporting video, voice and data packets over bi-directional HFC networks. DOCSIS originally was based on a return path frequency spectrum from 5 MHz to 42 MHz. More recent DOCSIS standards have increased the return path frequency spectrum (e.g., 5 MHz to 85 MHz) to provide additional return path channels thereby increasing return path bandwidth.

DETAILED DESCRIPTION

In some implementations of this disclosure systems and methods can operate to provide return path transmitters capable of supporting legacy and extended return path frequency ranges.

Figure 1:
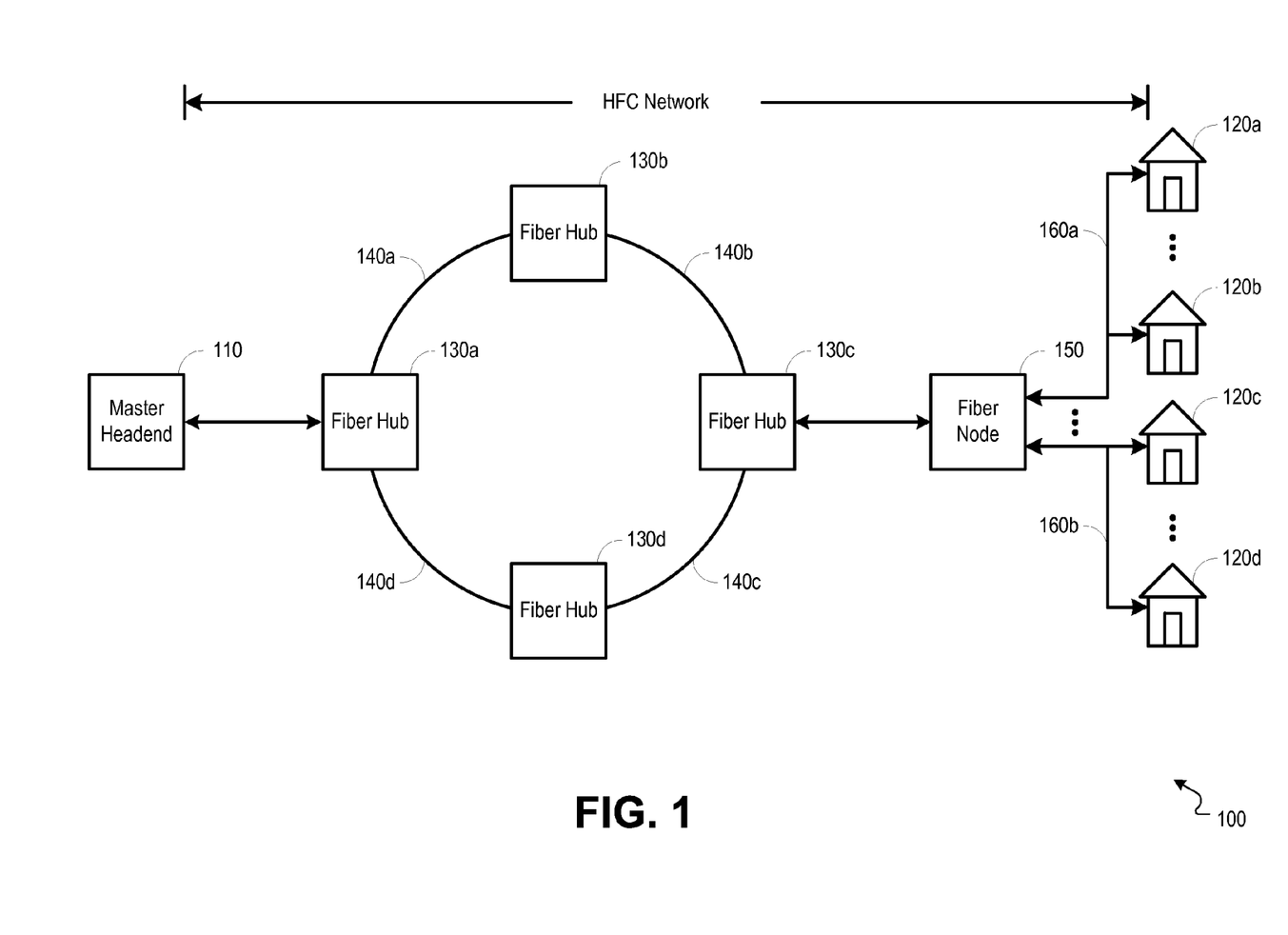
FIG. 1 is a block diagram illustrating an example HFC network operable to provide video, voice and data services to subscribers.

A return path transmitter can receive return path RF electrical signals for digitization, optical conversion and transport over a fiber optical link. An analog to digital converter (A/D) can be used to digitize the return path RF electrical signals. Digital circuitry can provide low pass filtering and processing of the digitized RF electrical signals prior to conversion to optical signals for transport. In some implementations, by combining a properly chosen A/D sampling rate and precision with a configurable digital filter, a return path transmitter can support either legacy (5 MHz to 42 MHz) and extended (5 MHz to 85 MHz) return paths thereby simplifying HFC network upgrades by MSOs. FIG. 1 is a block diagram illustrating an example HFC network operable to provide video, voice and data services to subscribers. A master headend 110 can transfer information to/from subscriber(s) 120a-d through a HFC network. In some implementations, fiber hubs 130a-d can be interconnected with optical fibers forming a ring, constituting the "fiber" portion of the HFC network. In other implementations, a pair of optical links (not shown) can be used for the ring interconnection of fiber hubs 130a-d where information can travel in a clockwise direction on one ring and counterclockwise on the second ring thereby providing communication resiliency. Wavelength division multiplexing (e.g., dense wavelength division multiplexing (DWDM)) can be used, with separate wavelengths used for forward and return paths on the optical links 140a-d. A fiber node 150 can include forward path receivers and reverse path transmitters. A forward path receiver can convert optical signals to electrical RF signals for forward path communications. A reverse path transmitter can convert electrical RF signals to optical signals for return path communications. Coax network segments 160a-b can be used as the transmission media of the electrical RF signals representing the "coax" portion of the HFC network.

Figure 2:
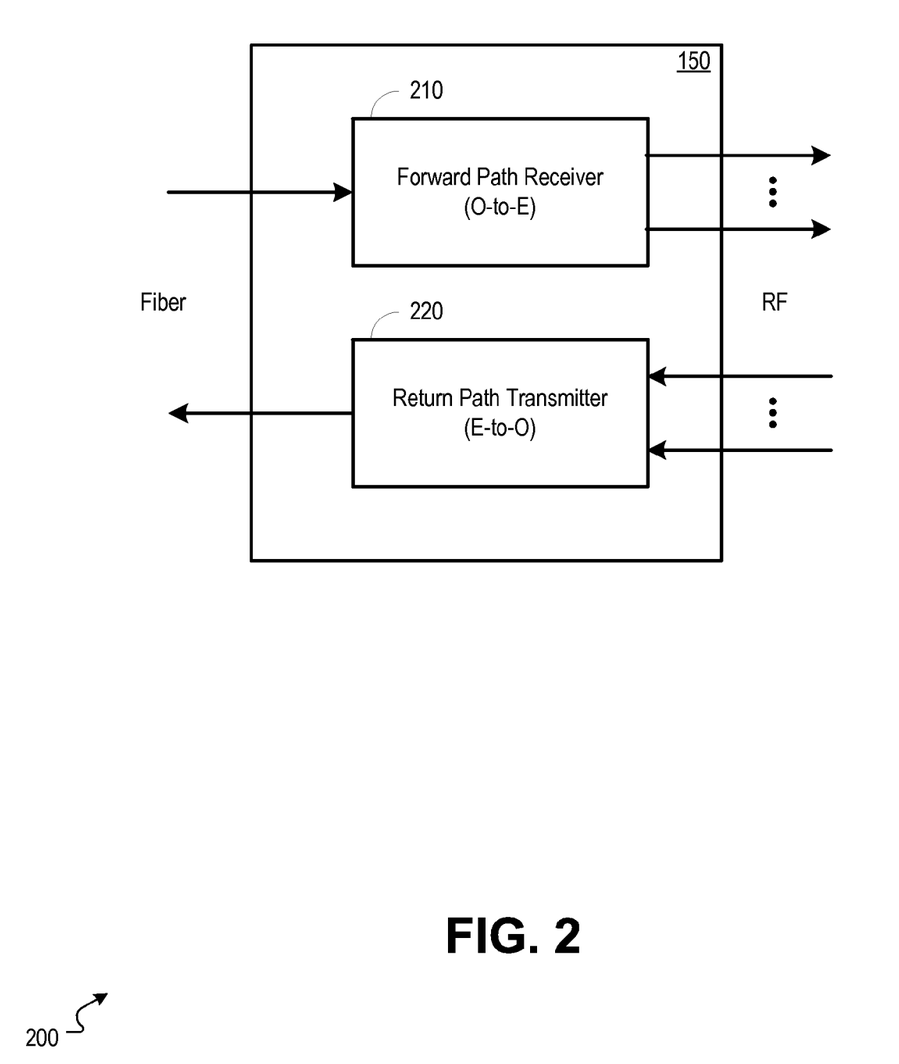
FIG. 2 is a block diagram illustrating an example fiber node operable to convert optical signals to/from electrical RF signals.

FIG. 2 is a block diagram illustrating an example fiber node operable to convert optical signals to/from electrical RF signals. In some implementations, fiber node (e.g., fiber node 150 of FIG. 1) can include forward path receiver(s) 210 and return path transmitter(s) 220.

Forward path receiver 210 can receive optical signals for conversion to electrical RF signals for transmission on one or more coax network segment(s) (e.g., coax network segments 160a-b of FIG. 1). Return path transmitter 220 can include multiple RF inputs for receiving electrical RF signals. In some implementations, the received electrical RF signals can represent legacy (e.g., 5 MHz to 42 MHz) return paths. In other implementations, the received electrical RF signals can represent extended (e.g., 5 MHz to 85 MHz) return paths. In yet other implementations, the received electrical RF signals can be a combination of both legacy and extended return paths.

A return path receiver located at the master headend (e.g., master headend 110 of FIG. 1) can perform the inverse function of the return path transmitter 220 for converting and separating return path optical signals to electrical RF signals.

Figure 3:
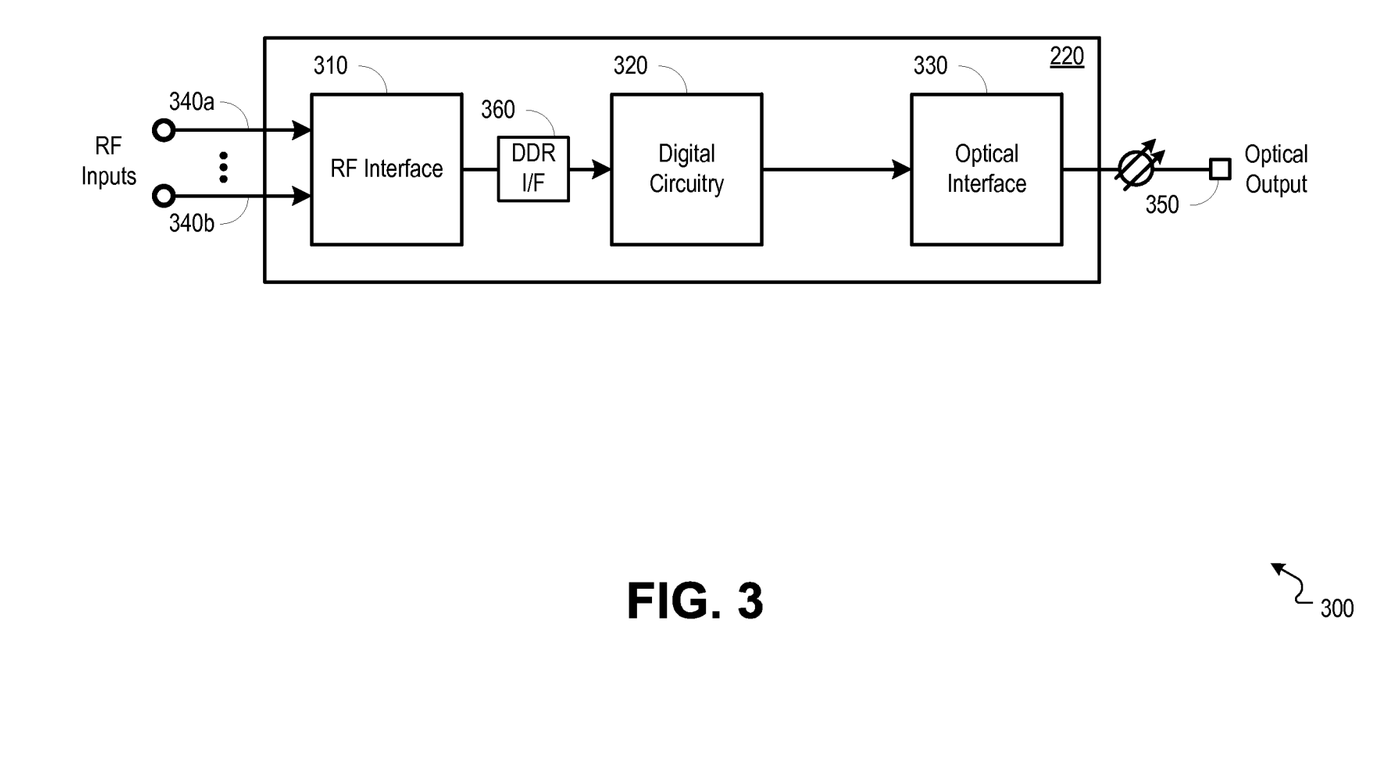
FIG. 3 is a block diagram illustrating an example return path transmitter in the fiber node.

FIG. 3 is a block diagram illustrating an example return path transmitter in the fiber node. In some implementations, return path transmitter (e.g., return path transmitter 220 of FIG. 2) can include RF interface 310, digital circuitry 320 and optical interface 330. RF interface 310 can include one or more RF inputs 340a-b to receive RF return path electrical signal(s) and generate digitized return path channel(s). Digital circuitry 320 can receive the digitized return path channel(s) for digital processing. Optical interface 330 can receive processed return path channel(s) for optical conversion and generate optical output 350.

Figure 4:
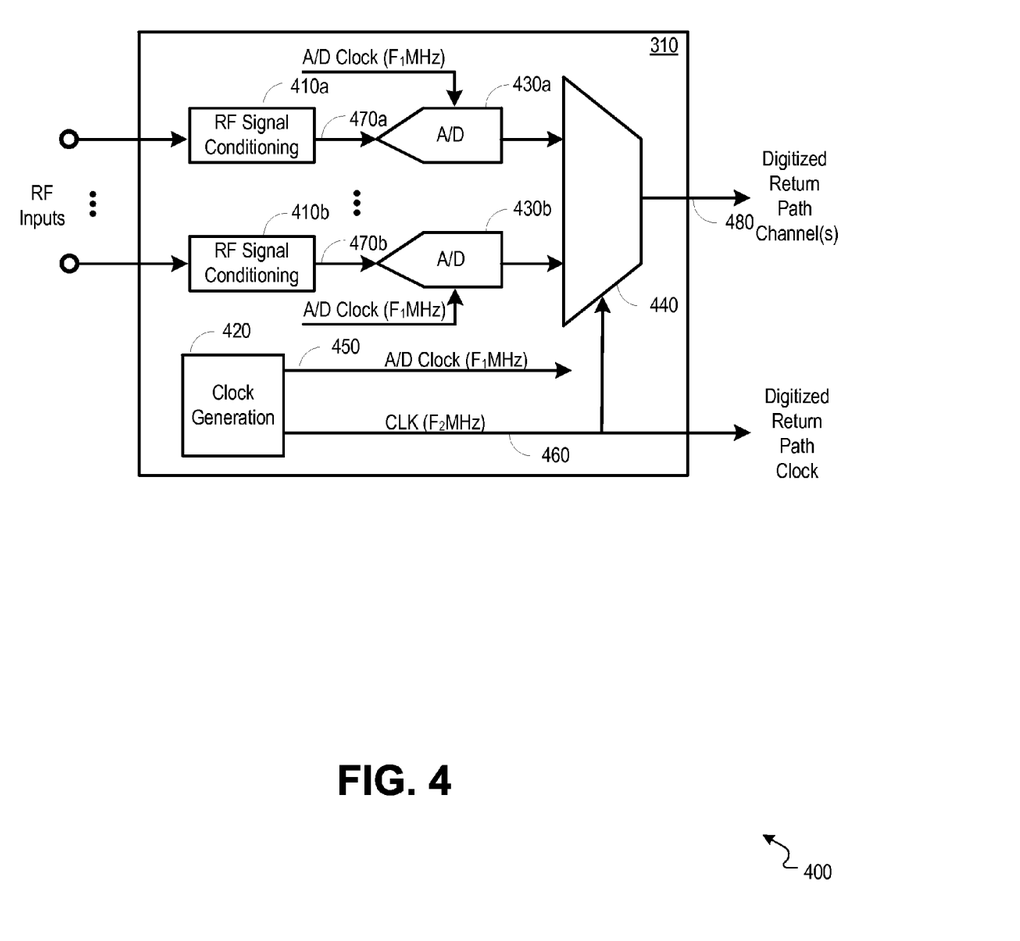
FIG. 4 is a block diagram illustrating an example RF interface in the return path transmitter.

FIG. 4 is a block diagram illustrating an example RF interface in the return path transmitter. In some implementations, RF interface 310 (e.g., RF interface 310 of FIG. 3) can include RF signal conditioning circuitry 410a-b, clock generation 420, A/D converters 430a-b and multiplexer 440.

RF interface 310 can include one or more RF inputs (e.g., RF inputs 340a-b of FIG. 3) to receive RF return path electrical signal(s) and generate digitized return path channel(s) 480. Clock generation 420 can generate A/D sampling clocks 450 at $F_1$ MHz and digitized return path clock 460 at $F_2$ MHz. In some implementations, RF signaling conditioning circuitry 410a-b can receive RF return path electrical signals on RF inputs (e.g., RF inputs 340a-b of FIG. 3) and generate conditioned RF outputs 470a-b. In some implementations, A/D converters 430a-b can receive the conditioned RF outputs 470a-b for digitization using A/D sampling clock 450. The output of each A/D converter 430 can represent a digitized return path channel. The rate of the A/D sampling clock 450 and the precision of the A/D converter 430 (i.e., number of bits) can be chosen to properly digitize RF return path electrical signals with an acceptable signal to noise ratio (SNR).

Multiplexer 440 can multiplex the outputs of the A/D converters 430a-b using digitized data clock 460 to generate digitized return path channel(s) 480. In some implementations, the multiplexing can be performed through synchronous time division multiplexing where the rate of the digitized return path clock 460 can be $F_2$ MHz where $F_2$ MHz=number of A/D converters×$F_1$ MHz. In other implementations, a double data rate (DDR) interface (e.g., DDR interface 360 of FIG. 3) can be used between the RF interface (e.g., RF interface 310 of FIG. 3) and the digital circuitry (e.g., digital circuitry 320 of FIG. 3) where the rate of digitized return path clock 460 can be reduced.

Figure 5:
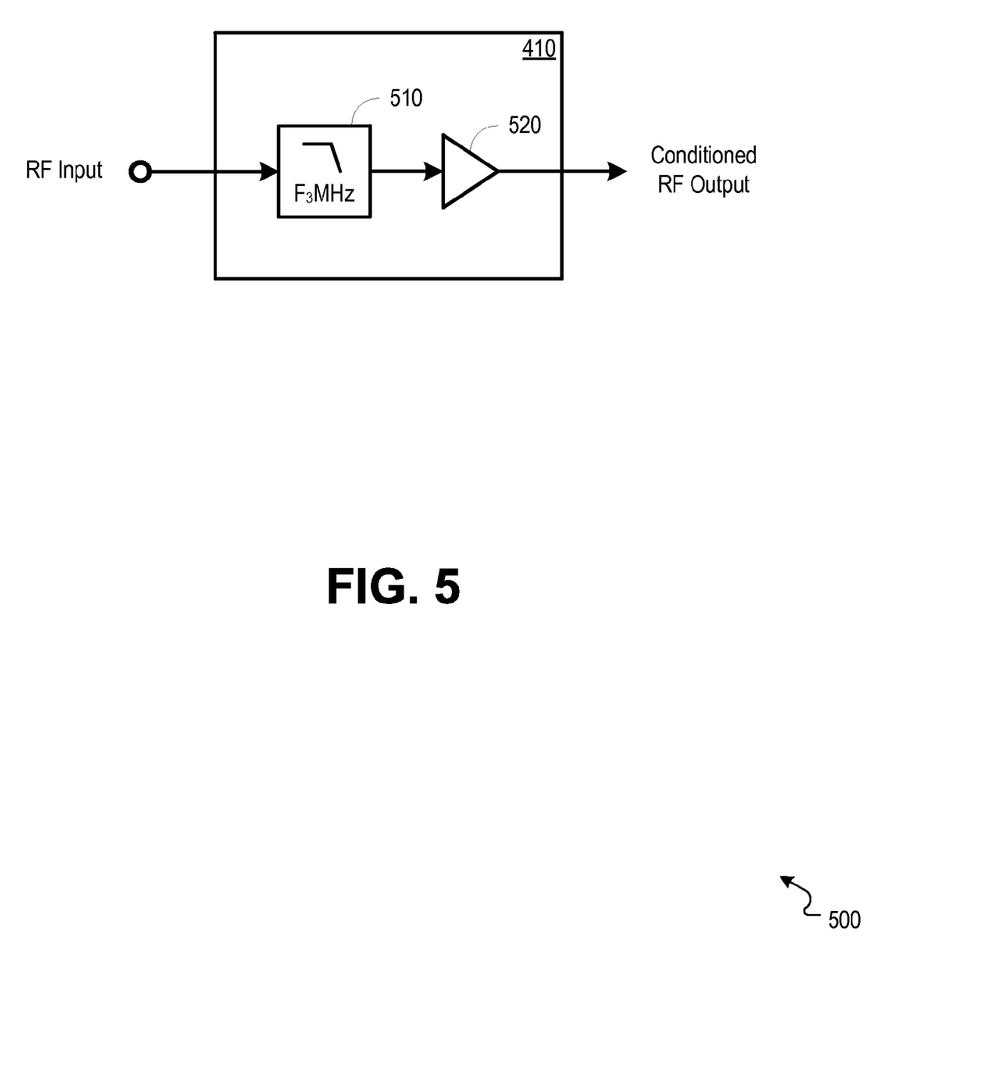
FIG. 5 is a block diagram illustrating an example RF conditioning circuitry in the RF interface.

FIG. 5 is a block diagram illustrating an example of RF conditioning circuitry in the RF interface. In some implementations, RF conditioning circuitry (e.g., RF conditioning circuitry 410 of FIG. 4) can include low pass filter 510 and RF amplifier 520. RF signaling conditioning 410a-b can receive a RF return path electrical signal on a RF input (e.g., RF input 340 of FIG. 3) and generate a conditioned RF output 470. The RF return path electrical signal can be filtered with low pass filter 510 that can attenuate frequencies above $F_3$ MHz. In some implementations, $F_3$ MHz can represent the upper frequency value of an extended return path frequency spectrum (e.g., 85 MHz). The output of low pass filter 510 can be amplified by amplifier 520.

Figure 6:
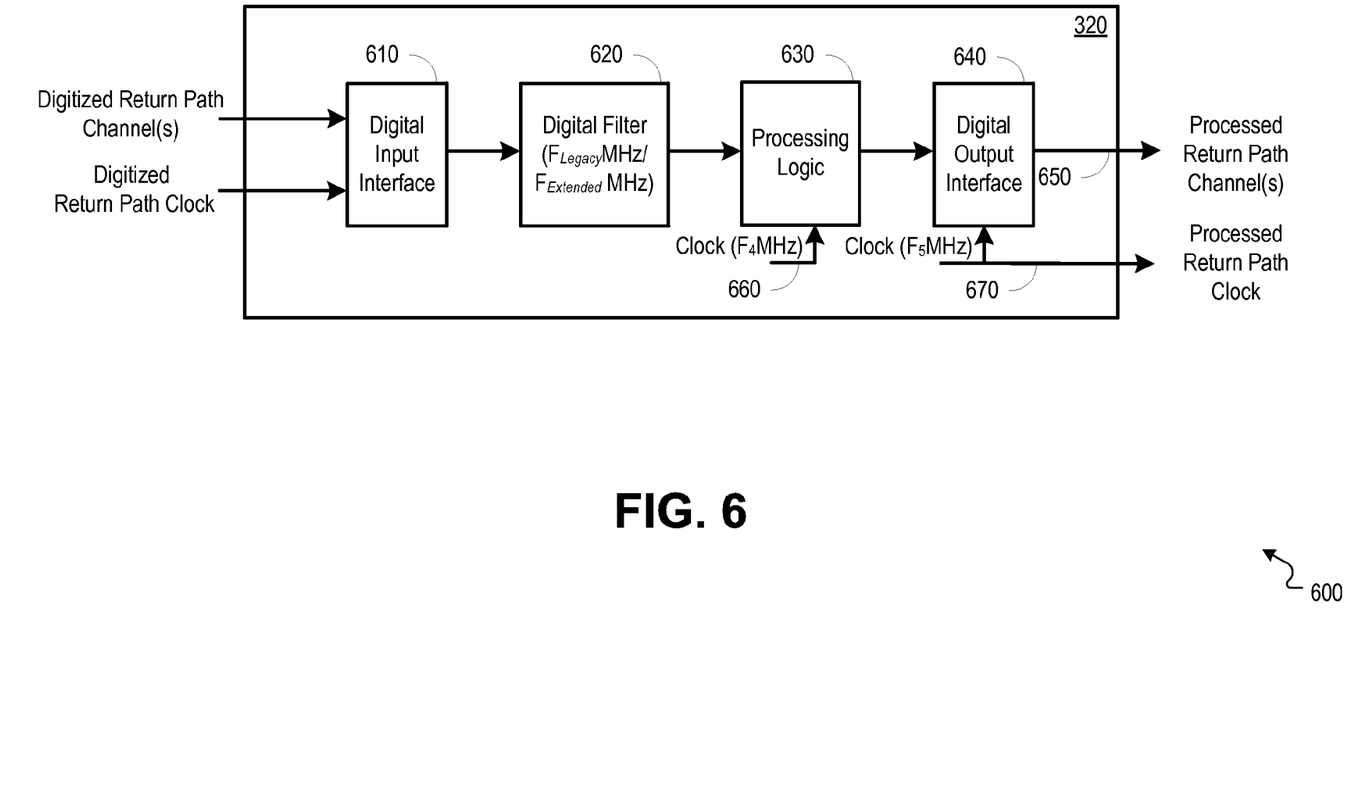
FIG. 6 is a block diagram illustrating example digital circuitry in the return path transmitter.

FIG. 6 is a block diagram illustrating example digital circuitry in the return path transmitter. In some implementations, digital circuitry (e.g., digital circuitry 320 of FIG. 3) can include a digital input interface 610, digital filter 620, processing logic 630 and a digital output interface 640.

Digital input interface 610 can receive digitized return path channel(s) (e.g., digitized return path channel(s) 480 of FIG. 4) from the RF interface (e.g., RF interface 310 of FIG. 3) using the digitized return path clock (e.g., digitized return path clock 460 of FIG. 4). Digital filter 620 can receive the digitized return path channel(s) from digital input 610. In some implementations the digital filter 620 can be a decimating finite impulse response (FIR) low pass filter. The digital filter 620 can perform independent filtering on each of the digitized return path channel(s). Legacy digitized return path channel(s) can be low pass filtered by $F_{Legacy}$ MHz with decimation of one half. Extended digitized return path channel(s) can be low pass filtered by $F_{Extended}$ MHz. In some implementations, $F_{Legacy}$ MHz and $F_{Extended}$ MHz can represent the high frequency value of legacy and extended return path frequency spectrums respectively (e.g., 42 MHz and 85 MHz).

In some implementations, digital circuitry (e.g., digital circuitry 320 of FIG. 3) can be implemented in a field programmable gate array (FPGA). Different FPGA images can be used to support different digital filter 620 configurations that can be required to support legacy and/or extended digitized return path channel(s).

Processing logic 630 can receive filtered digitized return path channel(s) from digital filter 620 and perform processing functions on each digitized return path channel(s) using processing clock 660 at a rate of $F_4$ MHz. In some implementations, the processing functions can include companding, addition of error correction, direct current (DC) balancing and frame encapsulation. Frame encapsulation can provide identification information of the return path digitized channel(s) for separation at the master headend (e.g., master headend 110 of FIG. 1) for optical to electrical RF signal conversion by a return path receiver.

Digital output 640 can receive processed digitized return path channel(s) from processing logic 630 and generate processed return path channel(s) 650 associated with processed return path clock 670 at a rate of $F_5$ MHz. In some implementations, processed return path clock 670 clock can be at a rate of $F_5$ MHz where $F_5$ MHz can be equal to the line rate of the optical output (e.g., optical output 350 of FIG. 3) divided by the width (i.e., number of bits) of the processed return path channel(s) 650 interface. In other implementations, a DDR interface can be used for the interface between digital circuitry (e.g., digital circuitry 320 of FIG. 3) and the optical interface (e.g., optical interface 330 of FIG. 3) where the rate of processed return path clock 670 can be reduced. In other implementations, the rates of processing clock 660 and processed return path clock 670 can be equal (i.e., $F_4$ MHz=$F_5$ MHz).

In some implementations, the same circuitry for processing logic 630 and digital output 640 can be used for processing both legacy and extended digitized return path signals. Legacy digitized return path signals can reside in one return path channel and extended digitized return path signals can occupy two return path channels.

Figure 7:
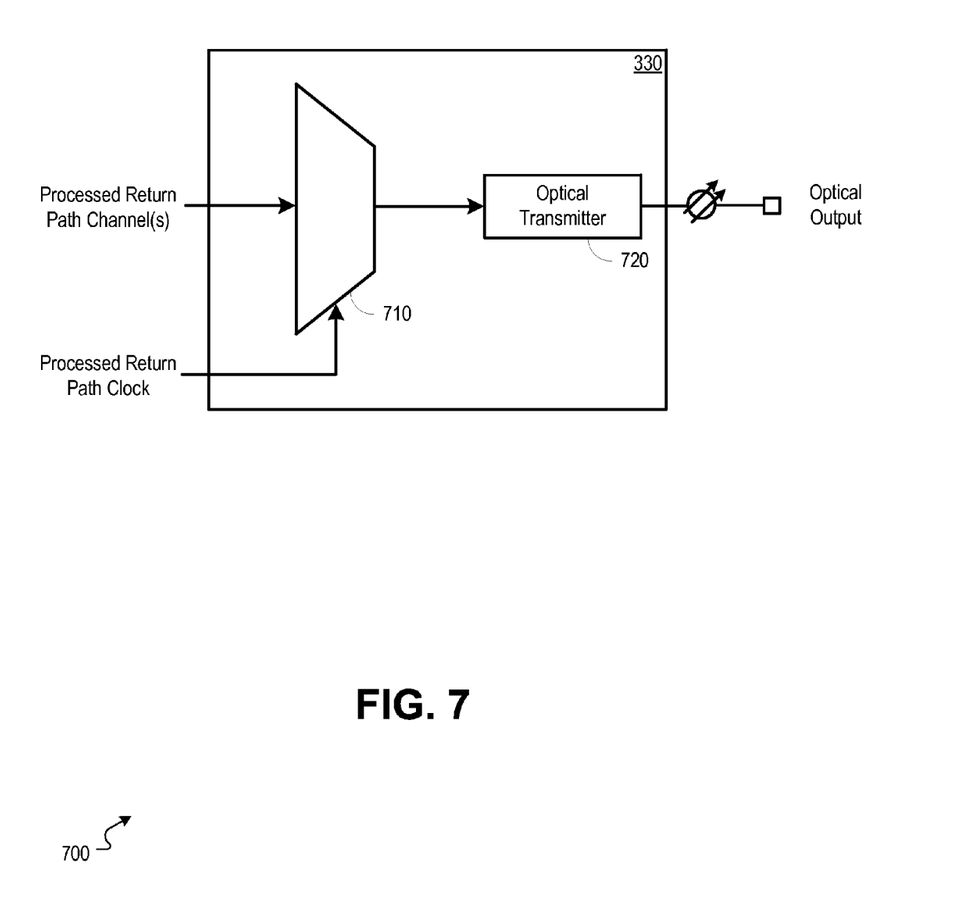
FIG. 7 is a block diagram illustrating an example optical interface in the return path transmitter.

FIG. 7 is a block diagram illustrating an example optical interface in the return path transmitter. In some implementations, optical interface (e.g., optical interface 330 of FIG. 3) can include a serializer 710 and optical transmitter 720.

Serializer 710 can receive processed return path channel(s) (e.g., processed return path channel(s) 650 of FIG. 6) with a processed return path clock (e.g., processed return path clock 670 of FIG. 6) and generate a serial bit stream.

Optical transmitter 720 can receive the serial bit stream from serializer 710 and generate an optical output (e.g., optical output 350 of FIG. 3). In some implementations, optical transmitter 720 can be implemented with a small form-factor pluggable (SFP) optical transceiver module. In some implementations, the optical output can conform to an OC-48 line rate. In other implementations, the optical output can conform to an OC-192 line rate. In another implementation, the optical output can conform to an OC-768 line rate. In some implementations, a return path transmitter (e.g., return path transmitter 220 of FIG. 2) can support two legacy or one extended return path using an OC-48 optical output (e.g., optical output 350 of FIG. 3). In other implementations, a return path transmitter can support various combinations of legacy and extended return paths when optical interfaces with line rates greater than an OC-48 optical output can be used. In some implementations where a OC-48 optical output can be used, two legacy return paths can be digitized by the A/D converters (e.g., A/D converters 430*a-b* of FIG. 4) with a precision of x-bits and an A/D sampling clock (A/D clock 450 of FIG. 4) at a rate of $F_1$ MHz. In some implementations, a precision of 12-bits and a sampling clock where $F_1$ MHz=207.36 Msps can be used. A digital filter (e.g., digital filter 620 of FIG. 6) can be implemented in the digital circuitry (e.g., digital circuitry 320 of FIG. 3) through a FPGA image to digitally filter two digitized return path channels. In some implementations, the digital filter can attenuate frequencies above $F_{Legacy}$ MHz, where $F_{Legacy}$ MHz=42 MHz and decimation of one half can be performed. Support of one extended return path channel can require a different FPGA image implementing a digital filter that can attenuate frequencies above $F_{Extended}$ MHz, where $F_{Extended}$ MHz=85 MHz and no decimation can be performed. In other implementations, the return path transmitter can be simplified to a single A/D converter and surrounding circuitry in configurations where support of a single extended return path can be required.

While this disclosure contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed:

1. A return path transmitter, comprising:
    a radio frequency (RF) interface comprising RF inputs;
    a first RF input received through the RF interface, the first RF input configured to receive one of a first RF return path electrical signal within a 5 MHz to 42 MHz frequency spectrum and a second RF return path electrical signal within a 5 MHz to 85 MHz frequency spectrum;
    a second optional RF input received through the RF interface, the second optional RF input configured to receive a third RF return path electrical signal within a 5 MHz to 42 MHz frequency spectrum;
    the RF interface further comprising circuitry configured to perform RF signal conditioning and digitize the RF inputs to present a digitized return path data stream; and
    digital circuitry comprising a digital filter and processing logic, wherein the digital filter is configured to filter digitized return path channels received from the RF interface, the digital filter filtering the digitized return path channels by one of a first digital filtering function and a second digital filtering function, thereby producing filtered digital return path signals for transmission.

2. The transmitter of claim 1, wherein the circuitry configured to perform the RF signal conditioning comprises a low pass filter to attenuate frequencies above 85 MHz.

3. The transmitter of claim 1, wherein the first digital filtering function is configured to attenuate frequencies above 42 MHz.

4. The transmitter of claim 3, wherein the first digital filtering function is further configured to perform decimation by one half.

5. The transmitter of claim 1, wherein the second digital filtering function is configured to attenuate frequencies above 85 MHz.

6. The transmitter of claim 1, wherein the digital circuitry is implemented in a field programmable gate array (FPGA) using FPGA images.

7. The transmitter of claim 6, wherein different FPGA images are used to implement each one of the first digital filtering function attenuating frequencies above 42 MHz and perform decimation of one half and the second digital filtering function attenuating frequencies above 85 MHz.

8. A system, comprising:
    a radio frequency (RF) interface comprising RF inputs each configured to receive an RF return path electrical signal, wherein the RF return path electrical signal is one of a legacy RF return path electrical signal and an extended RF return path electrical signal;
    the RF interface further comprising analog to digital converters configured to convert the RF inputs to digitized return path channels;
    the RF interface further comprising a multiplexer configured to multiplex the digitized return path channels;
    digital circuitry comprising a digital filter, wherein the digital filter is configured to filter the digitized return path channels by different filtering functions;
    the digital circuitry further comprising processing logic and a digital output interface, wherein the processing logic is configured to process the digitized return path channels to produce a digital output to the digital output interface; and
    an optical interface configured to generate an optical output from the digital output interface of the digital circuitry.

9. The system of claim 8, wherein the legacy RF return path electrical signal is in the 5 MHz to 42 MHz frequency spectrum.

10. The system of claim 8, wherein the extended RF return path electrical signal is in the 5 MHz to 85 MHz frequency spectrum.

11. The system of claim 8, wherein a double data rate (DDR) interface is used to connect the RF interface to the digital circuitry and the digital circuitry to the optical interface.

12. The system of claim 8, wherein the digital circuitry is implemented in a field programmable gate array (FPGA) using FPGA images.

13. The system of claim 12, wherein different FPGA images are used to implement different filtering functions.

14. The system of claim 8, wherein the processing logic configured to process the digitized return path channels and the digital output interface are the same.

15. The system of claim 8, wherein the processing logic and the digital output operate with a substantially identical clock rate.

16. The system of claim 8, wherein one digitized return path channel is used for the legacy RF return path electrical signal and two digitized return path channels are used for the extended RF return path electrical signal.

17. A method, comprising:
  receiving radio frequency (RF) inputs each configured to receive an RF return path electrical signal, wherein the RF return path electrical signal comprises one of a legacy RF return path electrical signal and an extended RF return path electrical signal;
  digitally converting the RF inputs to digitized return channels;
  digitally filtering one digital return path channel used for the legacy RF return path electrical signal by a first filtering function and digitally filtering two digital return path channels used for the extended RF return path electrical signal by a second filtering function;
  processing the digitized return path channels to produce a digital output; and
  optically generating an optical output from the digital output.

18. The method of claim 17, wherein the digitally filtering is performed by a field programmable gate array (FPGA) using FPGA images.

19. The method of claim 18, wherein different FPGA images are used to implement each of the first filtering function and the second filtering function.

* * * * *